(12) United States Patent
Rodriguez et al.

(10) Patent No.: US 8,118,912 B2
(45) Date of Patent: Feb. 21, 2012

(54) LOW POWER ATMOSPHERIC WATER GENERATOR

(76) Inventors: Felix Rodriguez, Webster, TX (US); Nizar K. Khanji, Houston, TX (US)

(*) Notice: Subject to any disclaimer, the term of this patent is extended or adjusted under 35 U.S.C. 154(b) by 374 days.

(21) Appl. No.: 12/554,890

(22) Filed: Sep. 5, 2009

(65) Prior Publication Data
US 2011/0056888 A1 Mar. 10, 2011

(51) Int. Cl.
*B01D 53/06* (2006.01)
*C02F 1/32* (2006.01)

(52) U.S. Cl. ............... 95/113; 95/123; 96/115; 96/125; 96/144; 96/225

(58) Field of Classification Search .................. 96/115, 96/125, 144, 150, 224, 225, 396; 95/113, 95/117, 123; 210/748.11, 764
See application file for complete search history.

(56) References Cited

U.S. PATENT DOCUMENTS

| | | | | |
|---|---|---|---|---|
| 6,868,690 | B2 * | 3/2005 | Faqih | 62/291 |
| 7,251,945 | B2 * | 8/2007 | Tongue | 62/93 |
| 7,601,206 | B2 * | 10/2009 | Call et al. | 96/125 |
| 7,789,942 | B2 * | 9/2010 | Vanderstraeten et al. | 95/113 |
| 2007/0028769 | A1 * | 2/2007 | Eplee et al. | 95/113 |
| 2011/0232485 | A1 * | 9/2011 | Ellsworth | 95/91 |

* cited by examiner

*Primary Examiner* — Frank Lawrence, Jr.
(74) *Attorney, Agent, or Firm* — Robert F. Gilbert

(57) ABSTRACT

Embodiments of the invention include a system and a method for purifying and storing water produced from atmospheric air to provide a safe, inexpensive source of potable water. Improvements over prior systems and methods include the use of two isolated air chambers, one for ambient air used to capture moisture from the atmosphere, and another for clean rechargeable air to convert the captured moisture into condensate and using a rotating mass of hygroscopic material and a condensation unit, each of which is periodically sterilized by heat.

12 Claims, 2 Drawing Sheets

LOW POWER ATMOSPHERIC WATER GENERATOR

BACKGROUND OF THE INVENTION

1. Field of the Invention

This application relates generally to apparatus and methods of purifying and storing water produced from atmospheric air and more particularly an apparatus and method to effectively purify and store water produced from atmospheric air by use of heat and hygroscopic material.

2. Description of the Related Art

Water production systems that generate water from atmospheric air produce water that is generally free of the chemicals and minerals found in tap or bottled water. This feature is viewed favorably by most advocates of the water from air systems, but the lack of residual disinfectant chemicals pose a problem of growth of pathogens and algae in the stored water. Since these systems depend on the introduction of ambient air which is not sterile for the production of water and since the water is stored in the system until used by the consumer, special techniques must be employed to ensure that the water and the water storage systems remain free of pathogens and algae for years with very little maintenance. Likewise, the absence of minerals like calcium and sodium result in water that tastes "flat" so the system must introduce adequate and safe amounts of the minerals required to provide pleasant tasting water.

SUMMARY OF THE INVENTION

One embodiment of the invention includes an apparatus for producing, purifying and storing potable water from air comprising the following:

a) a closed air passageway containing purified air;
b) an open air passageway containing filtered ambient air where the input filter is carbon impregnated with silver;
c) a rotating mass of hygroscopic material comprising a portion of the mass in fluid contact with the closed air passageway, another portion of the mass in fluid contact with the open air passageway, adapted to periodically move each portion of the mass through both passageways wherein all portions will alternately pass from one air passageway into another air passageway, each portion of the mass alternating between a hydrated state and a dehydrated state;
d) a heating unit in fluid contact with the purified air comprising a heating element, a temperature sensing unit and a controller, the controller having at least two temperature setpoints, one setpoint for normal water production operations and another setpoint for decontamination of the air in the closed air passageway;
e) a condensing unit comprising one or more condensing coils with inside surfaces and outside surfaces, the inside surfaces in fluid contact with the purified air, the outside surfaces in fluid contact with the ambient air;
f) a water collecting unit in fluid contact with the inside surfaces of the condensing coils comprising a tank for collection of condensation from the condensing coils and further comprising an ultraviolet radiation unit for destruction of microorganisms in the condensation where the radiation unit provides periodic ultraviolet irradiation of water collected by the condensing unit and provides additional irradiation of the water for a period of 10 to 60 minutes before the water is transferred out of the water collecting unit;
g) a water purification and storage unit comprising a collection of refillable chambers containing filter material suitable for use with potable water such as zinc activated zeolite, a mineral pi for introduction of minerals into the water, an input opening in fluid contact with the water collecting unit or the adjacent refillable chamber and an output opening connected to either the input for the next refillable chamber or a collapsible, disposable water storage unit and;
h) a computer control system to monitor and control the water production process and notify the user of required maintenance for the apparatus.

Another embodiment of the invention includes a method of purification of water produced from ambient air by use of hygroscopic material and a condensing unit comprising the steps of:

a) using a closed air passageway containing rechargeable air for absorption of water vapor from a mass of hygroscopic material and disgorgement of water in a condensing unit, where the rechargeable air has no direct fluid contact with the ambient air;
b) periodically decontaminating the hygroscopic material, condensing unit, closed air passageway and rechargeable air by raising the temperature inside the closed air passageway to in excess of 88 degrees C. for at least 15 minutes;
c) using a disposable pure water reservoir;
d) irradiating the water collected by the condensing unit periodically with ultraviolet irradiation;
e) irradiating the water collected by the condensing unit with ultraviolet radiation for a period of 10 to 60 minutes before transferring the water to the disposable pure water reservoir;
f) using a zinc or silver activated zeolite filter to control the microbial contamination of water in the disposable pure water reservoir;
g) controlling the water production process and notifying the user of required maintenance with a computerized control system and;
h) using an ambient air input filter of carbon impregnated with silver to remove particulate matter and pathogens from the ambient air.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS

Figure 1:
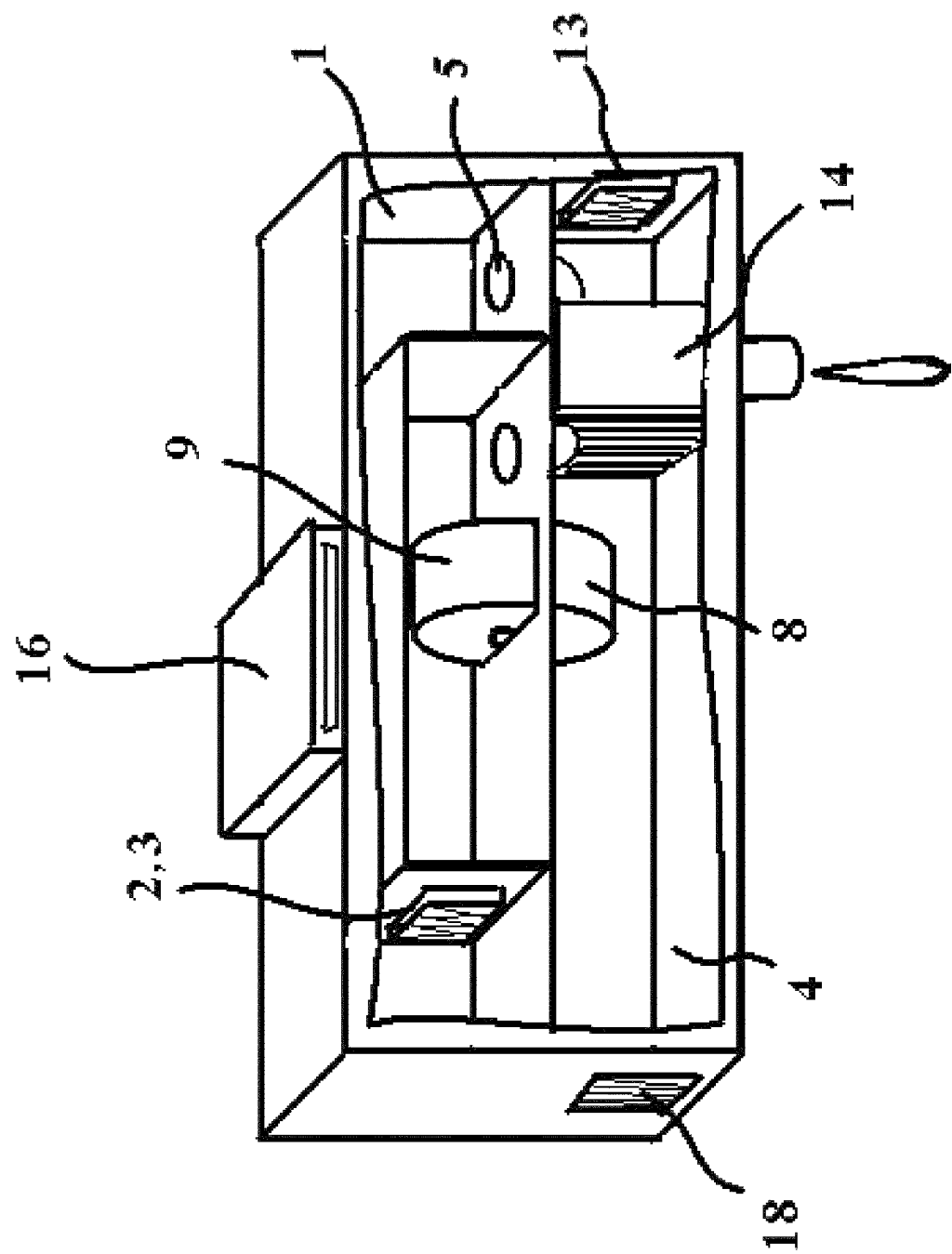
FIG. 1 illustrates the closed air passageway and the open air passageway and those elements that are contained within these passageways in this embodiment of the invention.

Generating and storing potable water produced from atmospheric air by means of a mass of hygroscopic material (sometimes referred to as molecular sieve or desiccant) requires a multistep approach to achieve pleasant tasting water that remains free of contaminants and pathogens until the delivery of the water to the user. In these systems, atmospheric water vapor, which is water created by evaporation, is condensed into liquid form and stored until used. The water produced is generally free of inorganic impurities, including minerals essential for providing the pleasant taste of "pure water" but can often contain pathogens and contaminants that are introduced into the water generation system from the ambient air.

Minerals to provide pleasant tasting water can be introduced into the condensate in a variety of ways by dissolving fixed, safe amounts of the essential minerals. Of course, taste is subjective, so there is no one formula for a mixture of minerals and pure water that will satisfy all consumers of the water. But generally, studies have shown that pure water mixed with trace amounts of calcium and sodium will be safe for human consumption and will provide the pleasant taste that will satisfy most consumers.

Keeping the water free of pathogens is a more vexing problem. Pathogens will be present in the atmospheric air which is an essential component of systems that produce water by means of hygroscopic material. The atmospheric air and the airborne pathogens will be passed through the hygroscopic material with the ambient air, so contamination of the system is inevitable.

Proper filtration of the ambient air can significantly reduce the airborne pathogen density, but the introduction of some live pathogens from the ambient air will occur. Once in the system, a moist, warm environment will likely encourage the growth of the pathogen population.

In addition to filtering the ambient air before drawing it into the system, the pathogen population can be kept under control by utilizing a separate air chamber for absorption of water from the atmospheric air. In this manner, most of the pathogens that survive the ambient air filter will be carried out of the system by the ambient air without coming into contact with the air that is used to extract the moisture from the hygroscopic material in a closed-air chamber.

Periodic decontamination of the hygroscopic material and the closed-air chamber by raising the temperature of that chamber to temperatures above 88 degrees Centigrade for up to 15 minutes will also keep the pathogen population in check. This same technique can be used to periodically sterilize the inside of the condensation unit, so the water collected will contain few pathogens.

Water stored in the collection tank can be exposed to ultraviolet radiation to eliminate pathogen growth in the collection tank in accordance with well documented procedures for radiation frequencies, levels, time of exposure and distance of the water from the radiation source. Likewise, ultraviolet radiation can be used to sterilize the water before it is moved into the final storage tank/delivery system.

Water moved from a collection tank to the final storage tank is passed through a series of filters that can function both as devices to introduce the minerals into the water as described above and also to remove pathogens or other particulate matter. Cartridges of activated carbon have proven to be effective as filter material. An additional stage or an additional filter cartridge is used to introduce trace amounts of residual antimicrobial material. For this stage, zinc or silver activated zeolite has shown to be effective for providing long term antimicrobial residual effect. Methods to ensure that the user will periodically replace the filter cartridges will safeguard against a filter system that has become ineffective with age.

Finally, utilization of a disposable, collapsible plastic bag for the final storage tank will help reduce the pathogen population in the delivered water by periodic disposal of a tank that may have become contaminated. Also, a flexible storage bag minimizes extra air in the storage tank that can encourage growth of aerobic pathogens common in water delivery systems.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 2:
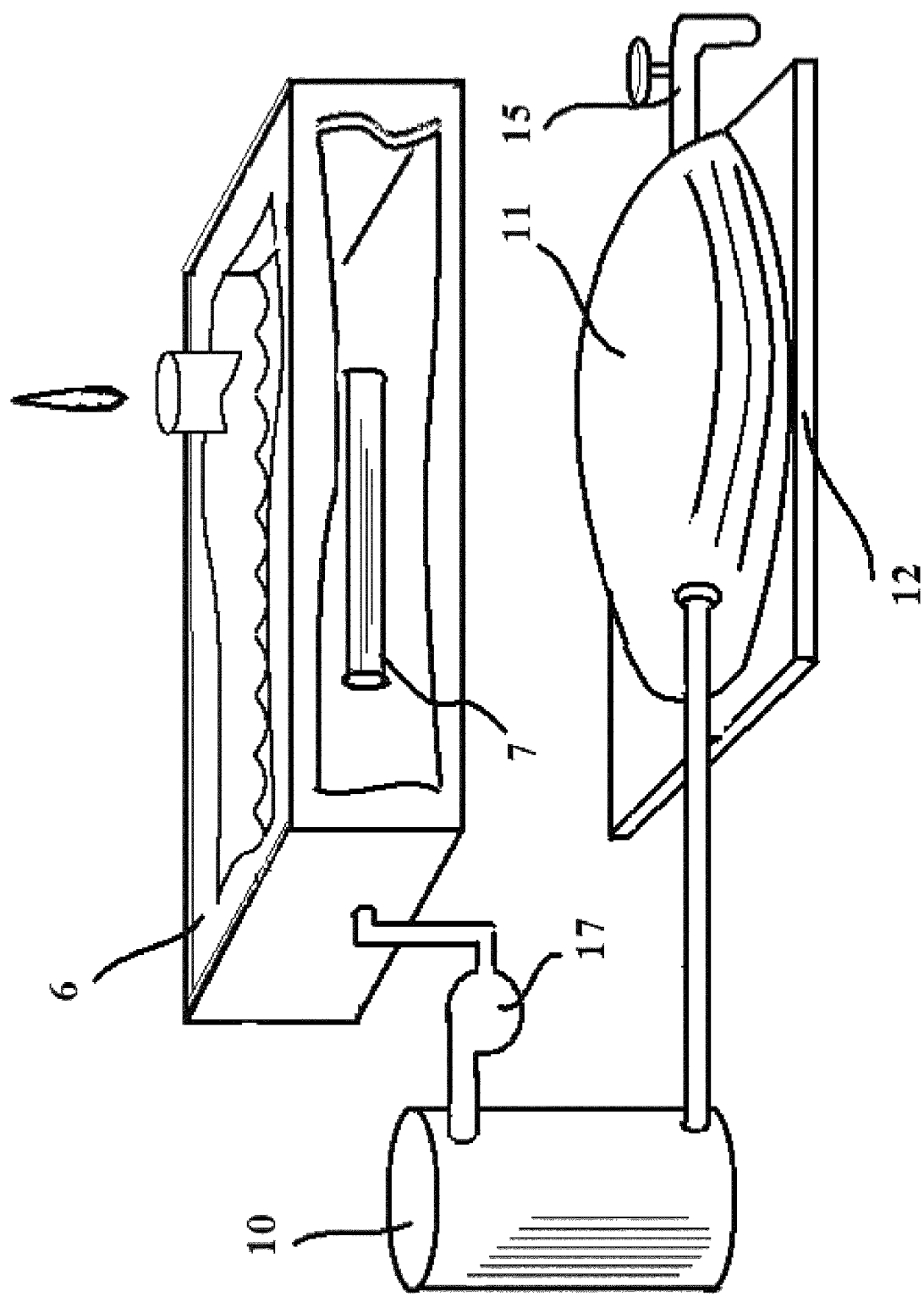
FIG. 2 illustrates the water collection and storage subsystem for one embodiment of the invention.

FIG. 1 is an illustration of an apparatus for producing, purifying and storing potable water from air according to one embodiment of the invention. FIG. 2 illustrates the water collection and storage subsystem for an embodiment of the invention. The illustrations depict the elements of this apparatus generally. Some of the details that may be essential to the apparatus, but the depiction of which will not further the discussion of this particular embodiment of the invention have been left out of the illustration. For instance, the wiring harnesses showing electrical paths for control and power to the electrical components of the apparatus have been omitted to simplify the illustration.

Referring to FIGS. 1 and 2, the housing of this embodiment of the invention includes two air chambers. In the closed air chamber (1) where air is forced by a fan at the rate of 50 to 150 cubic feet per minute (2) through controllable heating elements (3) that raise the air temperature to 75-82 degrees C. This air is then passed through the portion of the mass of rotating hygroscopic material (9) that has been saturated with moisture. The hot air forces the hygroscopic material to release the trapped water into the air in the closed air chamber in the form of water vapor. This moisture-laden air is then passed through the interior of the condenser coils (5). Once each day, the computer control system (16) changes the heater setpoint temperature to in excess of 88 degrees C. for a period of 15 or more minutes to decontaminate that portion of the mass of hygroscopic material that is in the closed air chamber, plus the air and the interior of the chamber and the interior of the condenser coils (5).

The condenser coils (14) are a collection of copper tubes extending through a seal in the closed air chamber into the open air chamber (4). In the open air chamber, the ambient air (from outside the unit) is forced through a charcoal filter impregnated with silver (13) over the exterior of the condenser coils by a fan (13) at the rate of 580-1000 cubic feet per minute, cooling the coils and the moisture laden air in the interior of the condenser coils, causing condensation on the interior of the coils.

After the ambient air in the open air chamber is forced over the condenser coils, it is passed through that portion of the hygroscopic material (8) that has been dehydrated in the closed air chamber before being discharged through a vent (18) in the housing. The dehydrated portion of the hygroscopic material then absorbs moisture from the ambient air so that as it rotates, the newly hydrated portion of the hygroscopic material will move into the closed air chamber. In this manner, the process of transferring the moisture from the open ambient air chamber to the closed air chamber will proceed in a continuous fashion.

Water that condenses on the inside of the condenser coils drips into the collection tank (6). The water collected in the tank is irradiated by a submerged ultraviolet light (7) used to destroy most of the pathogens that might be introduced into the system. The ultraviolet light source provides irradiation of the water with 9 watts of electromagnetic radiation for 10 to 20 minutes every hour.

The ultraviolet light (7) is controlled by a computer control system (16) that also monitors the water level in the collection tank (10) and the final storage tank (11). The control system also controls the pump (17) used to move the water from the collection tank, through the filters (10) to the disposable water reservoir (11). Prior to activating the pump to transfer the water out of the collection tank, the computer control system will irradiate the water in the collection tank with the ultraviolet light (7) for 20 minutes.

Water that is pumped out of the collection tank is passed through one or more filters (10). The filter enclosures allow for quick replacement of the filter cartridge and mineral pi contained within. The filtration cartridge contains activated carbon and zinc or silver activated zeolite to remove any remaining contaminants and pathogens in the water and to provide some residual antimicrobial effect. The mineral pi consists of a solid pellet that will deliver 40 milligrams of calcium and sodium for each liter of water that passes over it.

Water that is passed through the filters flows into the disposable water reservoir (11) if the reservoir is not full. This reservoir is made of flexible plastic to allow it to collapse or expand as the volume of water in the reservoir diminishes or increases. This inexpensive storage reservoir is easily replaced to minimize the risk of extensive pathogen populations in the reservoir. Typical replacement cycle is 3 to 6 months. Water is dispensed through a spigot (15) attached to the reservoir.

The disposable water reservoir rests on a peltier plate (12) to lower the temperature of the stored water before dispensing. Two different cold water dispensing temperatures are provided, −3 to 6 degrees C. and 7 to 9 degrees C.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention.

It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for producing, purifying and storing potable water from air comprising:
    a closed air passageway containing purified air;
    a heating unit in fluid contact with said purified air comprising a heating element, a temperature sensing unit and a controller, said controller having at least two temperature setpoints and a timing mechanism, at least one said temperature setpoint and time for normal operations and at least another said temperature setpoint and time for sterilization of said closed air passageway;
    an open air passageway containing filtered ambient air;
    a condensing unit comprising one or more condensing coils with inside surfaces and outside surfaces, said inside surfaces in fluid contact with said purified air, said outside surfaces in fluid contact with said ambient air;
    a water collecting unit comprising a tank in fluid contact with said inside surfaces of said condensing coils and a source of ultraviolet electromagnetic radiation immersed in condensate collected in said tank;
    a disposable water reservoir in fluid contact with said water collecting unit;
    a rotating mass of hygroscopic material comprising a hydrated portion and a dehydrated portion, said hydrated portion in fluid contact with said closed air passageway, said dehydrated portion in fluid contact with said open air passageway, adapted to periodically move each portion of said mass through both passageways wherein all portions will alternately pass from one said air passageway into another said air passageway, each portion alternating between a hydrated state and a dehydrated state and;
    a water purification unit comprising a refillable chamber, an input opening and an output opening, said input opening in fluid contact with said water collecting unit and said output opening in fluid contact with said disposable water reservoir, said chamber containing filter material suitable for use with potable water.

2. The apparatus of claim 1 wherein one of said temperature setpoints is used for normal operation with said setpoint between 75 and 82 degrees C. and another said temperature setpoint is used for a periodic decontamination cycle with said setpoint in excess of 88 degrees C.

3. The apparatus of claim 1 wherein said refillable chamber includes a mineral pi for introduction of minerals.

4. The apparatus of claim 1 wherein said refillable chamber includes metal activated zeolite as filler material.

5. The apparatus in claim 1 wherein said water purification unit comprises multiple refillable chambers connected in series.

6. The apparatus of claim 1 wherein said ultraviolet radiation unit provides periodic ultraviolet irradiation of water collected by said condensing unit and provides additional irradiation of said water for a period of 10 to 60 minutes before said water is transferred to said disposable water reservoir.

7. The apparatus of claim 1 additionally comprising a computer control system to monitor and control said apparatus and notifying users of required maintenance for said apparatus.

8. The apparatus of claim 1 additionally comprising an ambient air input filter of carbon impregnated with silver.

9. A method of purification of water produced from ambient air by use of a mass of hygroscopic material and a condensing unit comprising the steps of:
    a) using a closed air passageway containing rechargeable air for absorption of water vapor from a mass of hygroscopic material and disgorgement of water in a condensing unit, said rechargeable air having no direct fluid contact with said ambient air;
    b) decontaminating periodically said hygroscopic material, said condensing unit, said closed air passageway and said rechargeable air by heating said closed air passageway to a temperature in excess of 88 degrees C. for at least 15 minutes;

c) using a disposable water reservoir;

d) irradiating water collected by said condensing unit periodically with ultraviolet irradiation; and e) irradiating water collected by said condensing unit with ultraviolet radiation for a period of 10 to 60 minutes before transferring said water to said disposable water reservoir.

10. The method of claim 9 additionally comprising using a metal activated zeolite filter to control microbial contamination of water in said disposable water reservoir.

11. The method of claim 9 additionally comprising using a computerized control system to monitor and control said method.

12. The method of claim 9 additionally comprising using an air input filter of carbon impregnated with silver to remove particulate matter and pathogens from the air used by the apparatus.

* * * * *